Patented May 25, 1926.

1,585,743

UNITED STATES PATENT OFFICE.

FREDERICK M. VENZIE, OF PHILADELPHIA, PENNSYLVANIA.

PLASTER BLOCK AND COMPOSITION THEREFOR.

No Drawing. Original application filed October 12, 1923, Serial No. 668,045. Divided and this application filed January 20, 1925. Serial No. 3,592.

This patent is a division of my application for Letters Patent, Serial No. 668,045, filed October 12, 1923.

This invention, generally stated, relates to partition, wall, ceiling and like building construction, and has more especial relation to a so-called plaster composition and block as made therefrom and as used in said above constructions.

The leading object of the present invention is to provide a composition suitable for the manufacture of co-called plaster block adapted for inside or interior constructions, which blocks are possessed of lightness in structure; which may be inexpensively manufactured; and which are possessed of fire, moisture and sound resisting properties.

A further object of the present invention is to employ a specific combination of ingredients for attaining a composition suitable for manufacture of plaster-blocks possessed of the advantages set forth in the leading object.

A further object is to employ in my improved composition a combination of plaster-of-Paris and powdered cork as a base; a small quantity of fibre as a binder, and as a rapid hardening agent, sulphite-of-zinc. Other and further objects not at this time appearing will be referred to hereinafter.

The invention consists of the novel composition and paster-blocks as made therefrom as hereinafter described and finally claimed.

In the manufacture of my novel composition, as used for the making of so-called plaster blocks for inside or interior constructions, such as walls, partitions, ceilings and the like, I employ plaster-of-Paris, powdered or finely granulated cork, wood pulp, manila, cocoanut or other suitable fibre both long and short, and sulphite-of-zinc. Of these materials, the plaster-of-Paris and powdered or finely granulated cork form the base of my composition; the fibres act as a binder; and the sulphite-of-zinc serves as an agent for the rapid hardening of the composition. All of the materials are employed in a dry state and mixed together, sufficient water being added to enable molding thereof into blocks or slabs of any desired configuration and size. The proportions of these ingredients, as I prefer to employ them, are as follows: Plaster-of-Paris 17 lbs., powdered or finely granulated cork 2 lbs., fibres (preferably a mixture of long and short fibres) three ounces, sulphite-of-zinc one ounce.

A plaster block as made from a composition as above described is possessed of both strength and lightness and has moisture, fire and sound resisting properties which makes it particularly suitable for erecting interior building structure, as partitions, walls, and ceilings, especially since the composition may be easily and inexpensively made.

What I claim is:

1. A composition of the character stated comprising plaster-of-Paris, powdered or finely granulated cork, fibre and sulphite-of-zinc.

2. A composition of the character stated comprising about three parts of plaster-of-Paris, about one part powdered or finely granulated cork, a small quantity of fibre and a small quantity of sulphite-of-zinc.

3. As a new article of manufacture a block or slab formed of plaster-of-Paris, powdered or finely granulated cork, fibre and sulphite-of-zinc.

4. As a new article of manufacture a block or slab formed of a composition consisting of about three parts of plaster-of-Paris, abut one part of powdered or finely granulated cork, a sufficient quantity of fibres to ensure a binder and a sufficient quantity of sulphite-of-zinc to hasten hardening.

5. The herein described mode of making plaster-blocks or slabs which consists in taking about three parts of plaster-of-Paris, about one part of powdered or finely granulated cork, a sufficient quantity of long and short fibre to serve as a binding agent and a sufficient quantity of sulphite-of-zinc to hasten hardening, all in dry form, and mixing all together with sufficient water to enable the resultant composition to be molded into blocks or slabs.

In testimony whereof, I have hereunto signed my name.

FREDERICK M. VENZIE.